Patented June 10, 1930

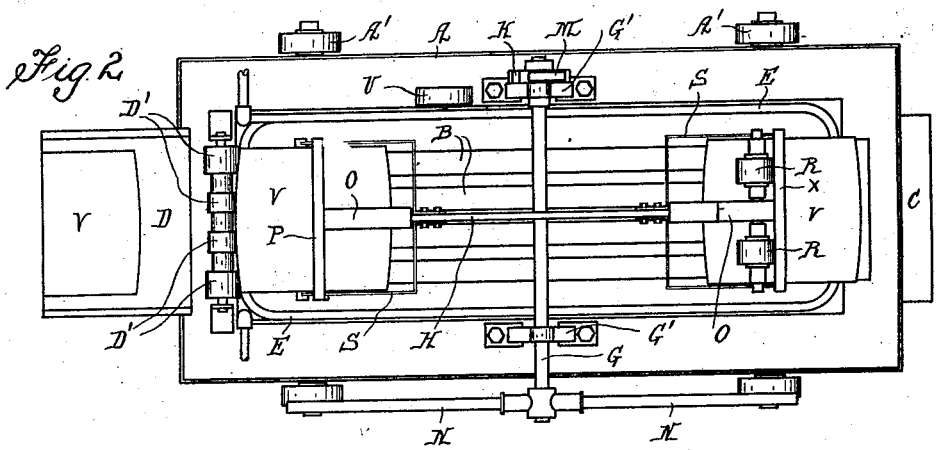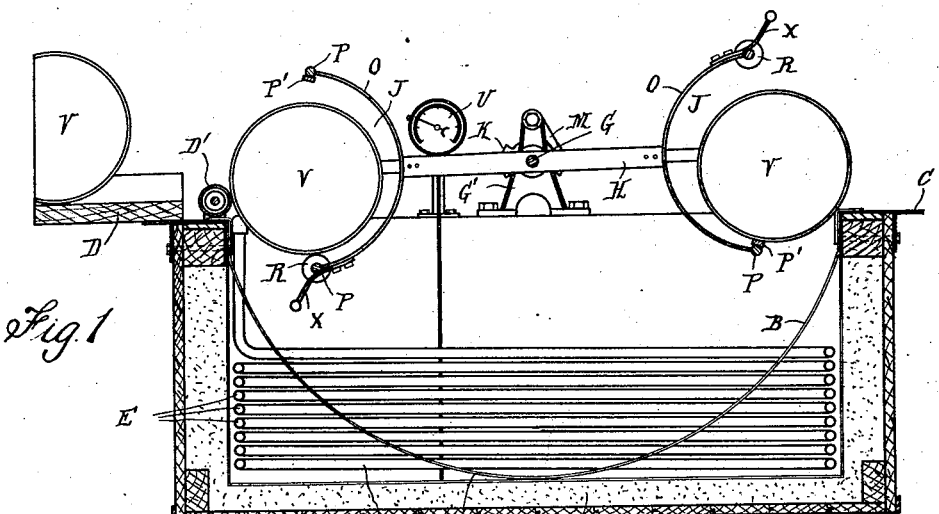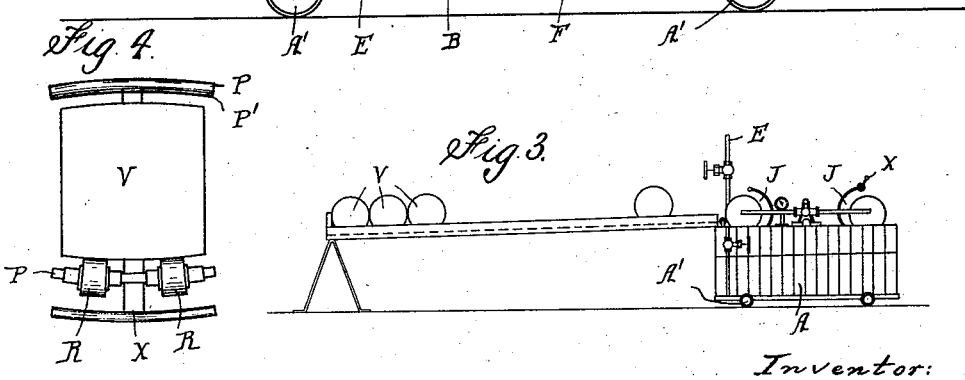

1,762,909

UNITED STATES PATENT OFFICE

EDWIN DANIEL BERRY, OF PALMERSTON NORTH, NEW ZEALAND

APPARATUS FOR USE IN COATING CHEESES WITH PARAFFIN WAX OR THE LIKE AND IN OTHER ANALOGOUS OPERATIONS

Application filed February 21, 1929, Serial No. 341,702, and in New Zealand March 30, 1928.

It has become customary in the cheese making industry to coat the cheeses with a hermetic sealing coating of paraffin wax or like preparation, for the purpose of preventing the evaporation of moisture and also loss of butter fat from the cheese and in other ways to preserve the flavour and texture of the product.

The present invention has been devised with the object of providing apparatus whereby this coating operation may be carried out efficiently and expeditiously and at a minimum cost. The apparatus while designed specially for this purpose, may be used for other analogous operations.

The apparatus designed provides for the cheeses being fed one by one into a tank in which a quantity of the coating preparation is maintained and wholly immersed therein and then delivered upon the other end.

It comprises the combination with a tank, which may have means therein for keeping the coating preparation in a hot molten condition (as is required when the preparation used is paraffin wax or like material) of a rotating dipping frame formed by a number of radiating carriers each of which is designed to receive and hold a cheese and which frame in its rotation carries the cheeses from one end of the tank down through the tank and delivers them upon the other end.

The apparatus in its details of construction, is illustrated in the accompanying drawings, in which:—

Figure 1 is a sectional side elevation of the tank showing the dipping apparatus in position therein, and charged with cheeses.

Figure 2 is a plan thereof.

Figure 3 is a sketch illustrating the whole of the operations.

Figure 4 is a detail view of one of the carrier cages, with a cheese in place therein.

In carrying out the invention, a tank A of approved material is provided, such tank being made of the required width, depth and length to suit its special circumstances. It may also, if desired, be mounted on wheels A′ to permit of it being readily moved from place to place. It is also provided with a false bottom or rolling plate B preferably of grid form as shown in the drawings, extending down in an arc from one end to the other and at one end connecting with a feeding table C and at the other with a delivery table D.

When the apparatus is to be used for coating cheeses with paraffin wax, such material requires to be kept in a hot molten condition and for this purpose a steam coil E may be arranged to encircle the inside of the tank and the walls of the tank covered by an insulator jacket F.

A thermometer U for indicating the heat of the solution contained within the tank is fitted thereon.

A spindle G is arranged to extend across above the top of the tank and is carried in bearing brackets G′ fixed on the tank sides. On this spindle two arms H are fixed to extend radially from opposite sides and each arm at its outer end has a frame or cage J affixed to it, which is so shaped and made that when brought opposite the end of the feeding table C a cheese, represented as V, may be rolled from such table into the cage, and then as the arm is turned down into the tank, the cheese will be caused to rest and roll upon the plate B, and then be carried up to the other end, opposite to the delivery table, so that it may be rolled out of the cage on to such table, or suitable tray as the case might be.

The spindle or shaft G has a ratchet wheel K affixed to one end, and a pawl M is pivoted to the adjacent bracket G′ to engage such ratchet wheel. These are so disposed as to provide for the arms H being held from reverse motion when they are so positioned as to extend, as shown in Figure 1, with one cage frame J in a position to have a cheese rolled into it from the feed table C and the other in a position just below that at which the cheese in it may be rolled out on to the delivery table D. They therefore serve to hold the rotating members so that the dipped cheese is held in a position to permit of the excess coating draining back into the tank, while another cheese is being rolled into the cage at the other end.

For rotating the arms H, any approved form of handle is affixed to the spindle G, as for instance the radial handle bar levers N.

The inner end of the delivery table D has a transversely extending delivery roller D' mounted so that it extends across the width of the tank edge. This roller is made with a number of wide grooves in its periphery. The cheese as it leaves the dipping cage runs out on to this roller and may be allowed to rest for a time while from it the surplus of the coating material drips; or congealed lobs may be scraped off with a suitable instrument back into the tank. The roller will then lead the cheese on to the table proper.

Each cheese holding frame or cage is made in any approved manner such as will ensure of the cheese being received and rolled around upon the plate B and then delivered at the other end. The form shown in the drawings consists in a semi-circular bow O that is secured to the extremity of the arm H and in each end of which a cross bar P is fixed. On the ends of one of these bars, small rollers R are mounted and both bars are given a longitudinal curve as shown in Figure 4, to make them conform to the curving of the cheese side so that the rollers R of the one bar then contact evenly with the cheese surface. The longitudinal curve in bar P on the non-roller side acts with the force of gravity in conveying the drips of molten wax or the like, clear of the cheese when it is in the draining position, as shown in Figure 4, thus giving the even, uniform coating so much desired. The rollers R are made interchangeable to fit the cross bars P so as to make the machine either left or right hand to suit any special circumstance, the rollers being used on the propelling side. The spread of the bow O is such as to dispose the rollers R and cross bar P a distance apart to allow for the cheese fitting easily between them. A guard S of springy nature is affixed to each side of each arm H and is shaped so that its end extends radially on one side of the enclosure formed by the bow. These guards engage the ends of the cheese and keep them from contact with the steam coils of the tank, as it is rolled through the dipping solution in the tank.

The non-roller bearing bar P is liable to become heated in the operations of the machine and by contact with the cheeses as they are fed into the machine, to cause them a measure of damage. In order to prevent this it is lined on its contact side with an insulating layer P' of fibre or like material. For a similar reason, the rollers R and D' may also be made of an insulating nature.

Each cage holding bow at its roller end is provided with an extension plate X which serves to prevent any possibility of the cheese as it rolls from the end of the bow dropping back between the roller D and the tank end and thus splashing the hot coating solution, besides stopping the running of the machine. This is of particular service when small cheeses are being dipped and coated.

While the appliance, as shown in the drawings, is made with two cheese receiving cages J, it is to be understood that the invention is not restricted to the use of such a number, as similar results may be obtained by providing a greater number of cages mounted on the rotating frame. Also the appliances may be duplicated in the same dipping tank by arranging separate frames side by side within the tank.

In some cases also the apparatus may be made so that either end may be used as the feeding end and the other then as the delivery end, the ratchet wheel K and pawl M being so made as to provide for the rotating frame being sustained in the position similar to that shown in Figure 1.

I claim:—

1. An apparatus of the character described, comprising a tank adapted to hold a coating liquid and constructed with an approximately semi-circular rolling plate or false bottom arranged lengthwise within it; a feeding table at one end of the tank top; a delivery table at the other end of the tank top, and a rotating frame including a shaft journaled on the tank sides; said frame being provided with a number of holding cages disposed upon the ends of radiating arms and adapted in the rotation of the frame to pass round above the surface of the said rolling plate; and stop means on the shaft to retain said cages in arrested position, relative to the feed and delivery tables.

2. An apparatus of the character described, comprising a tank adapted to hold a coating liquid, and constructed with an approximately semi-circular bottom plate arranged lengthwise in said tank; a feeding table at one end of the tank top; a delivery table at the other end of the tank top; a rotating frame mounted on the tank sides; a holding cage for the said rotating frame formed by a semi-circular bow fixed vertically upon the end of its radiating arm; a cross bar fixed in each end of the bow and rollers mounted loosely on the ends of one of such bars.

3. An apparatus of the character described, comprising a tank adapted to hold a coating liquid and constructed with an approximately semi-circular rolling plate or false bottom arranged lengthwise within it; a feeding table at one end of the tank top; a delivery table at the other end of the tank top, and a rotating frame, including a shaft journalled on the tank sides; said frame being provided with a number of holding cages disposed under the ends of radiating arms and adapted in the rotation of the frame to pass round above the surface of the said rolling plate; stop means on the shaft to retain said cages in arrested position relative to the feed and delivery tables; and heating coils in said tank for heating the tank.

4. An apparatus of the character described, comprising a tank adapted to hold a coating liquid and constructed with an approximately semi-circular rolling plate or false bottom arranged lengthwise within it; a feeding table at one end of the tank top; a delivery table at the other end of the tank top, and a rotating frame, including a shaft journalled on the tank sides, said frame being provided with a number of holding cages disposed under the ends of radiating arms and adapted in the rotation of the frame to pass round above the surface of the said rolling plate; stop means on the shaft to retain said cages in arrested position relative to the feed and delivery tables; and a grooved roller adjacent the edge of the delivery table, said roller being operative with one of said cages to hold an article to be coated in suspended draining position above said tank.

In testimony whereof, I affix my signature.

EDWIN DANIEL BERRY.